United States Patent [19]

Heinäkari et al.

[11] Patent Number: 5,441,196
[45] Date of Patent: Aug. 15, 1995

[54] WELDING METHOD

[75] Inventors: Matti Heinäkari; Ismo Ilola; Kyösti Kaukonen, all of Turku; Jari Nieminen, Raisio, all of Finland

[73] Assignee: Kvaerner Masa-Yards Oy, Helsinki, Finland

[21] Appl. No.: 195,923

[22] Filed: Feb. 14, 1994

[30] Foreign Application Priority Data

Feb. 16, 1993 [FI] Finland .................. 930668

[51] Int. Cl.⁶ .................................. B23K 9/038
[52] U.S. Cl. ........................... 228/222; 219/126; 228/46
[58] Field of Search .............. 228/46, 222; 219/126

[56] References Cited

U.S. PATENT DOCUMENTS

| | | | |
|---|---|---|---|
| 3,210,520 | 10/1965 | Arnold et al. | 219/126 |
| 3,211,887 | 10/1965 | Cotterman | 228/46 X |
| 3,419,700 | 12/1968 | Tanigaki et al. | 219/126 |
| 3,582,608 | 6/1971 | Ito et al. | 219/126 X |
| 3,585,343 | 6/1971 | Crichton | 219/126 X |
| 3,839,619 | 10/1974 | Normando et al. | 219/126 |
| 4,101,067 | 7/1978 | Sloan et al. | 228/222 |
| 4,125,758 | 11/1978 | Oishi et al. | 219/126 |
| 4,360,141 | 11/1982 | Kensrue | 228/46 |

FOREIGN PATENT DOCUMENTS

| | | |
|---|---|---|
| 2304432 | 10/1976 | France . |
| 3434701 | 6/1986 | Germany . |
| 1171846 | 11/1969 | United Kingdom . |

OTHER PUBLICATIONS

N. J. Normando, D. V. Wilcox and R. F. Ashton, "Electrogas Vertical Welding of Aluminum," 440-448, Welding Journal, Jul. 1973.

*Primary Examiner*—Kenneth J. Ramsey
*Attorney, Agent, or Firm*—Smith-Hill and Bedell

[57] ABSTRACT

A method of welding two plates together along a substantially vertical weld line between the two plates involves the use of a weld pool support device having internally formed channels through which flows a liquid coolant that is maintained considerably below ambient temperature.

18 Claims, 2 Drawing Sheets

WELDING METHOD

BACKGROUND OF THE INVENTION

The invention relates to a method for joining two metal plates together by welding and to a welded structure.

It is usual to use a large spherical tank for transportation and storing of liquified natural gas (LNG). The temperature of LNG is about −163° C., which places special demands on the choice of material for an LNG-tank and on the technique used for producing such a tank. Such a tank is preferably made of welded aluminum plates because the extremely low temperature of the contents of the tank does not have a deleterious effect on the strength properties of aluminum. The material of weldable plates suitable for the production of an LNG-tank is, for instance, according to the DIN-standard AlMg4, 5Mn, which corresponds to the U.S. ASTM-standard plate A-5083. As used herein, in relation to the material of weldable plates, the term aluminum includes an alloy of aluminum. The thickness of the aluminum plates used for manufacturing LNG-tanks is usually from about 25 mm to about 60 mm. The plates are arranged in abutting relationship and meet at a weld groove. The diameter of a typical spherical LNG tank is from 30 m to 40 m, and there are typically several hundred meters of joints to be welded in one such tank.

In construction of a spherical LNG-tank by welding aluminum plates, it is frequently necessary that a joint that is being welded be oriented vertically, whereby the welding takes place from below upwards. Due to the orientation of the weld groove, there is a tendency for the molten metal (or weld pool) to run out of the weld groove due to gravity. This tendency appears of course most strongly when the weld groove extends vertically, but may also appear to some extent, complicating the welding operation, when the angle of the weld groove to the horizontal is as small as 30°.

According to the known art of vertical welding, a cooled weld pool support device is used. The weld pool support device comprises a dam member that is moved upwards in the direction of the weld groove as the welding proceeds in the same upward direction. When welding steel, a piece of copper has usually been used as the dam member in a weld pool support device, but when welding aluminum difficulties have occurred, because a copper dam member readily adheres to molten aluminum. For solving this problem it has been suggested to use as the dam member a piece of graphite, see U.S. Pat. No. 3,585,343 or Welding Journal, July 1973, pages 440-448. However, a graphite dam member wears out far too rapidly to be satisfactory solution to the problem.

SUMMARY OF THE INVENTION

The object of the invention is to eliminate the difficulties typically experienced in the known art of vertical welding with a cooled weld pool support device. The invention is based on the observation that a considerable intensification of the cooling of the weld pool support device will make it possible to use a piece of copper as the dam member, not only for welding steel, but also in the welding of aluminum plates, without any substantial risk of adhesion between the dam member and the weld fillet giving rise to problems.

According to the invention, the temperature of the liquid coolant fed to the weld pool support device is kept in the range of +8° C. to −20° C., preferably in the range of 0° C. to −10° C. If the coolant is not cooled below the freezing point of water, clean water may be used as the coolant, otherwise other liquids have to be used, such as an aqueous solution containing an additive, such as glycol, to lower the freezing point of the solution far enough to prevent freezing of the solution during use.

The disposition of the cooling duct in the dam member, the rate at which liquid coolant is passed therethrough and the temperature of the liquid coolant supplied to the dam member should be chosen to create an intensity of cooling such that under steady-state conditions the molten metal of the weld forms a solidified layer on the side facing the dam member. At a distance of one or a few centimeters above the lower edge of the dam member, the solidified layer must be strong enough to hold the residual molten metal in place in the groove where it finally solidifies fully to form the fillet after the weld pool support device has passed.

When applying the method of the invention, it is important that the length of the dam member, measured in the direction of the weld groove, be sufficient to provide effective cooling. The preferred length of the cooled portion of the dam member in the direction of the weld groove is from about 7 cm to about 12 cm, preferably from 8 cm to 10 cm. Of course, a longer dam member may also be used, but this only makes the weld pool support device more expensive and possibly more difficult to use without providing any noticeable improvement in the welding process. The width of the dam member should exceed the width of the weld groove at the front surface of the plates (typically by between 20 and 40 mm) and for a groove of width 30 mm a dam member some 60 mm wide has proved to be suitable.

When welding aluminum plates, it is desirable to ensure that the cooling induced by the weld pool support device does not have any harmful effect on the edge areas of the plates at the sides of the weld groove. The weldability of an aluminum plate improves when it is slightly warmed. This is true up to a temperature of about 150° C. For this reason, when applying the invention to the welding of aluminum plates, the aim should be that the temperature of the edge area of the welded aluminum plates along each side of the weld groove clearly exceeds 100° C. This has a favorable effect on the welding speed.

When applying the invention, the dam member of the weld pool support device can favorably be made of copper, but other materials can also be used, such as aluminum, stainless steel or a ceramic material. The resistance to wear of all these materials has proved to be sufficient to make a reliable device. If a weld joint length of at least 50 meters can be welded with one dam member, the resistance to wear of the weld pool support device is judged to be satisfactory.

Because of the invention, the joining of relatively thick aluminum plates by means of a welded joint can be carried out from just one side. The use of one-sided welding instead of two-sided, noticeably lowers the welding costs. When using the method of the invention it is recommended to use, as known per se, a backing at the root side of the weld groove. The backing, which can be moving or stationary, can be of ceramic material or some other material resistant to heat.

Due to the invention, the welding speed can be increased noticeably compared to the speed achieved with known methods. In favorable cases the welding speed may even be nearly doubled. When applying the invention, the welding speed is advantageously from 2 to 5 cm/min when the thickness of the aluminum plates to be welded is from 25 to 60 mm. The welding speed is a very important factor, because there are typically between 300 and 400 m of joints to be welded by a method in accordance with the invention in one spherical LNG-tank and so the method according to the invention allows the time required for welding the plates together to be reduced substantially. Further, relatively large variations in the form and width of the weld groove may be tolerated when applying the invention. These kinds of variations appear when the forms of the plates to be welded together do not exactly correspond to one another. According to the known welding methods variations of only up to ±1 mm in the crosswise direction of the weld groove have normally been acceptable, whereas when applying the invention, variations of even up to ±5 mm in the crosswise direction of the groove may be allowed. Further, it has been discovered that a structure welded according to the method of the invention usually has enhanced structural strength compared to a corresponding structure produced by conventional prior art welding methods.

The invention also extends to a welded structure, especially to a spherical tank made of aluminum plates, which has been produced by applying the method of the invention.

BRIEF DESCRIPTION OF THE DRAWINGS

The invention will now be further described in greater detail, by way of example, with reference to the accompanying drawings, in which FIG. 1 schematically shows, in longitudinal section, a weld groove during application of the method according to the invention.

DETAILED DESCRIPTION

Figure 1:
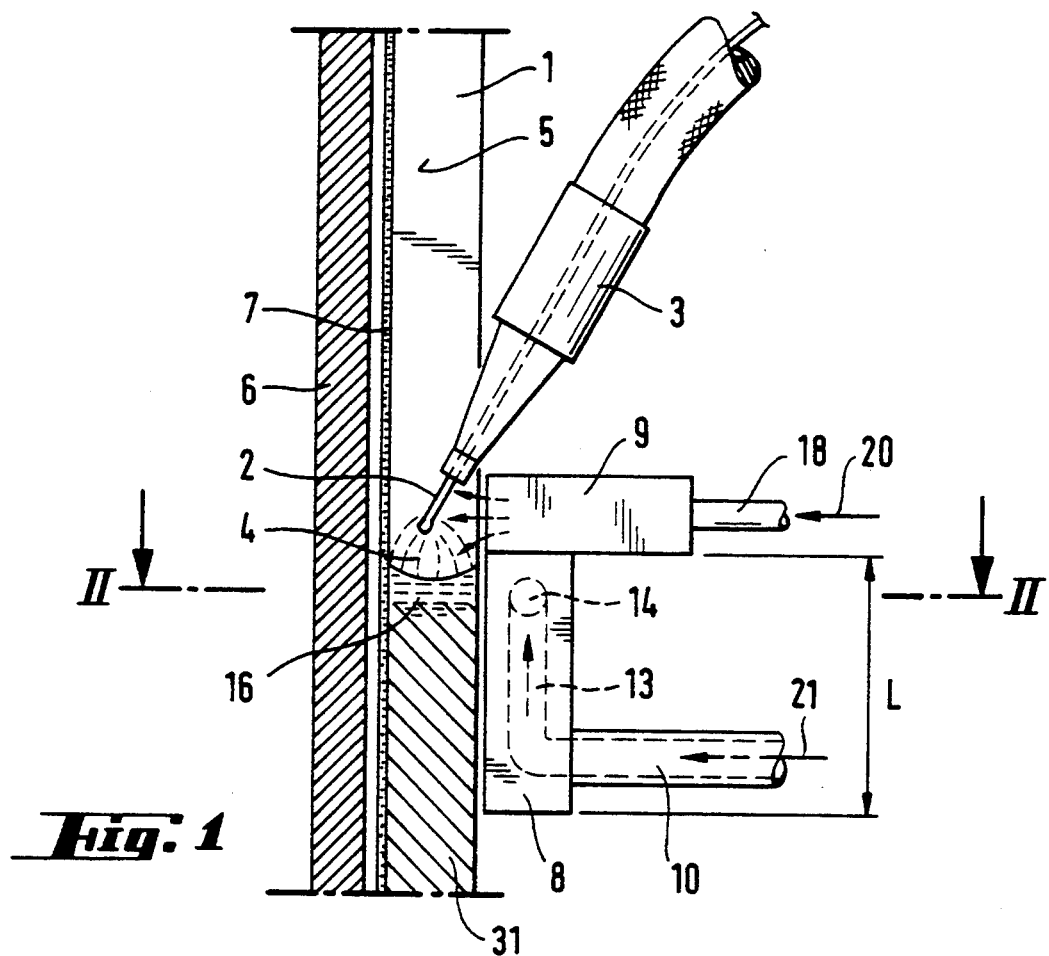

In the drawings, 1 indicates plates to be joined by welding, 2 a welding wire and 3 a feeder unit for advancing the welding wire 2 to a weld site. Between the free end of the welding wire 2 and the material to be welded, a conventional welding arc 4 is formed, which causes melting of the metal required for the welding process in a weld groove 5. Thus, following start-up of a welding operation, there is a certain volume of molten metal 16 which forms a pool under the arc 4. The weld groove 5 is, as will be apparent from FIG. 2, V-shaped and its welding side is to the right in FIG. 2 and its root side is to the left. At the root side of the weld groove 5 there is a backing 6. To minimize the risk of adhesion of the backing to the weld and/or the plates, the backing can be isolated from the welded joint by a layer of fibrous refractory material, e.g. in the form of glass fiber tape 7, which could be fastened to the plates at the root side of the weld groove or to the surface of the backing. Many separating layers (such as tape 7) melt or burn at least partly during the welding process, producing gases and combustion products which may be deleterious to the welding process. Therefore it can be preferable to use a backing without an isolating layer. A stationary ceramic backing can usually be used without a separating layer 7. At the welding side of the plates 1, a copper dam member 8 of a weld pool support device is located carrying on its upper side a feeder unit 9 for supplying shielding gas 20 through a connection tube 18.

The dam member 8 is efficiently cooled by a liquid coolant 21 pumped through it by means of a pump 19. The temperature of the coolant entering the dam member 8 is considerably below ambient or room temperature. The liquid coolant flows into the support device via a feed duct 10 and leaves the support device via a return tube 11. The temperature of the liquid coolant 21 is controlled (e.g. by a separate cooling device 12—see FIG. 2) so that heat is continuously extracted from the elements in and adjacent to the weld groove 5.

The cooling of the weld pool support device has been proved to be efficient enough, if an upwardly extending inlet duct 13 rises from the feed duct 10 on one side of the dam member 8 to its upper portion, where it connects to a horizontally-extending channel 14 which terminates at a downwardly-extending outlet duct 15 on the other side of the dam member 8, the duct 15 communicating with the return tube 11. This n-shaped, or inverted u-shaped, arrangement of cooling ducts has the disadvantage that the dam member 8 is cooled slightly more at its incoming side than at its outgoing side but this usually causes no harm. However, if a more uniform cooling is desired, an m-shaped or T-shaped arrangement can be used in which a feed duct 10 is located in the center of the dam member 8 which duct leads upwards from the bottom portion of the member 8 and branches into two sideways-extending cooling ducts in the upper portion of the member leading to two outgoing tubes 11 for the coolant, one at each side of the member 8.

The length L of the cooled part of the weld pool support device in the direction of the weld groove 5 is most suitably at least 7 cm and preferably about 10 cm.

As welding proceeds in the upward direction a shown in FIG. 1, the welding wire 2 and its feeder unit 3 are moved upwardly in synchronism with the gas feeder unit 9 and the weld pool support device. In a particular case welding speeds of 4.8 cm/min were achieved with aluminum plates of 30 mm thickness, 3.8 cm/min with plates of 42 mm thickness and 3.4 cm/min with plates of 45 mm thickness.

The coolant supply is controlled to ensure equilibrium temperature conditions such that, at least on the welding side, an open pool of liquid weld material 16 extends only part way down the length L of the dam member 8.

The edge regions of the plates 1 close to the open weld groove 5 are continuously warmed by the welding process. The cooling influence of the dam member 8 should not be allowed to interfere too strongly with this warming process. The cooling efficiency level for the edge areas of the dam member 8 should desirably be chosen so that the cooling occurring in the edge areas of the plates 1 adjacent to the weld groove 5 is not excessive. In these edge areas the temperature should not drop below 100° C. and should preferably clearly exceed 100° C., and more preferably be between 100° and 150° C.

Figure 2:
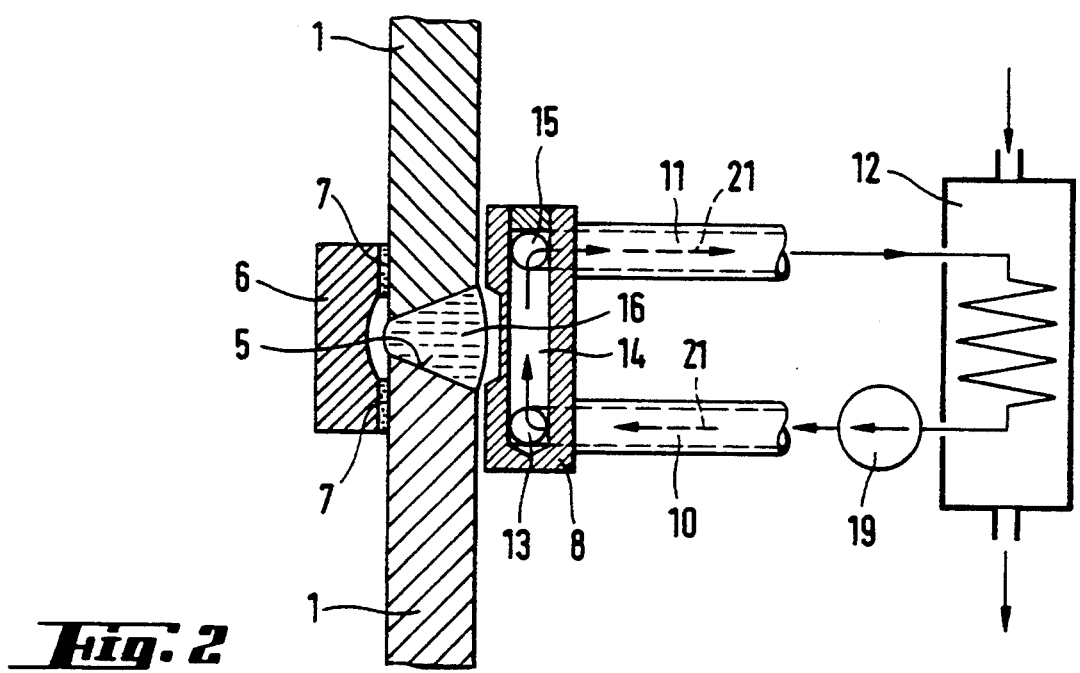
FIG. 2 is a section on line II—II of FIG. 1.

FIGS. 1 and 2 show a small clearance between the dam member 8 and the plates 1 and this is desirable but the clearance must not be so large as to allow downward spillage of pool material 16 during the welding process.

Figure 3:
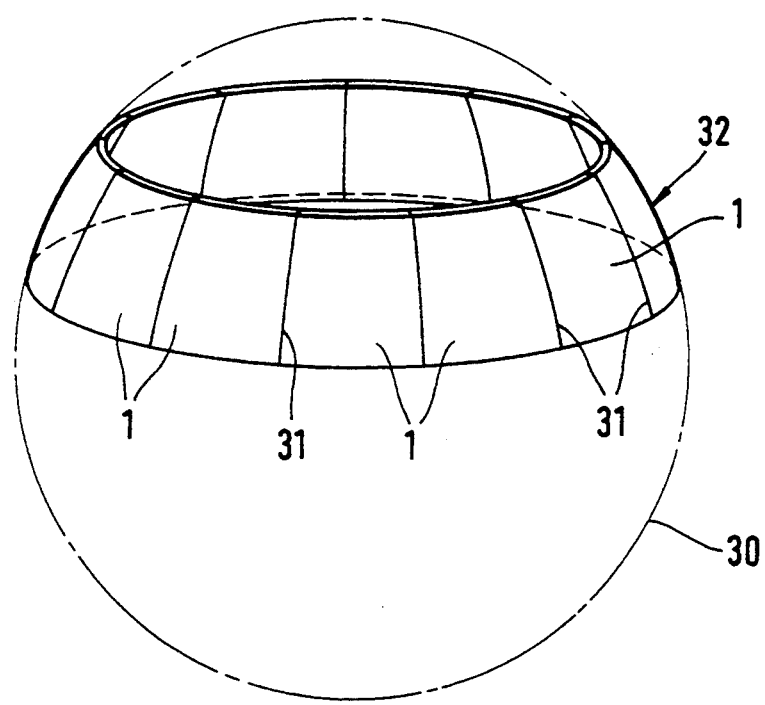
FIG. 3 is a schematic view of a spherical LNG-tank made by the method of the invention.

In FIG. 3, numeral 30 indicates a spherical LNG-tank formed from many curved plates 1 joined by welds 31 each of which has been formed with the weld line extending in a vertical direction using the method described with a coolant-cooled copper dam member 8. Several hundred meters of weld line are needed to form a tank of a diameter of 40 meters. Only one segment 32 of the spherical tank 30 is shown in full lines as an example of a portion where the invention is applied.

Using the invention for welding a spherical LNG-tank can occasion cost savings for the welding operation of about one third.

In place of a copper plate for the dam member 8, a plate of aluminum, stainless steel or ceramic material could be used.

The invention is not limited to the embodiment shown, since several modifications thereof are feasible within the scope of the following claims. For example, although the invention has been described in connection with joining aluminum plates, and particularly plates according to the ASTM standard A-5083, it can generally be applied to weldable aluminum plates or other metal plates having substantially similar weldability properties, e.g. titanium plates.

We claim:

1. A method for joining two metal plates that meet at a substantially vertical groove, comprising:
    employing a welding tool to form a one-sided weld that substantially fills the groove by advancing the welding tool along the groove in an upward direction,
    providing a weld pool support device, the weld pool support device comprising a dam member that is formed with a cooling duct,
    advancing the weld pool support device along the groove concurrently with the welding tool, and
    passing a liquid coolant through the cooling duct of the dam member, the temperature of liquid coolant supplied to the cooling duct being substantially below ambient temperature.

2. A method according to claim 1, wherein the temperature of the liquid coolant supplied to the cooling duct of the dam member is within the range of +8° C. to −20° C.

3. A method according to claim 1, wherein the temperature of the liquid coolant supplied to the cooling duct of the dam member is within the range of 0° C. to −10° C.

4. A method according to claim 1, wherein the dam member of the weld pool support device is dimensioned to have a cooled portion with a length (L) in the direction of the weld groove of from 7 to 12 cm.

5. A method according to claim 1, wherein the dam member of the weld pool support device is dimensioned to have a cooled portion with a length (L) in the direction of the weld groove of from 8 to 10 cm.

6. A method according to claim 1, wherein the cooling of the dam member is so controlled that the temperature of the edge areas of the plates at the sides of the weld groove during continuous welding exceeds 100° C.

7. A method according to claim 1, wherein the dam member is made of a material which has little tendency to adhere to liquid weld material.

8. A method according to claim 7, wherein the material of the dam member has sufficient wear resistance that a weld joint length of at least 50 meters can be formed using the dam member before the dam member becomes so worn that it does not support the weld pool.

9. A method according to claim 7, wherein the material of the dam member is copper, aluminum, stainless steel or a ceramic material.

10. A method according to claim 1, comprising providing a backing at the root side of the weld groove.

11. A method according to claim 10, wherein the backing is a stationary ceramic backing.

12. A method according to claim 1, comprising providing a moving backing at the root side of the weld groove.

13. A method according to claim 1, wherein the welding speed is controlled to be in the range of 2 to 5 cm/min.

14. A structure formed of plates welded together, wherein at least some welds are produced using a method according to claim 1.

15. A structure according to claim 14, wherein the structure is a spherical tank.

16. A method for joining two aluminum plates that meet at a substantially vertical groove, comprising:
    employing a welding tool to form a one-sided weld that substantially fills the groove by advancing the welding tool along the groove in an upward direction,
    providing a weld pool support device, the weld pool support device comprising a dam member that is formed with a cooling duct,
    advancing the weld pool support device along the groove concurrently with the welding tool,
    passing a liquid coolant through the cooling duct of the dam member, the temperature of liquid coolant supplied to the cooling duct being substantially below ambient temperature, and
    controlling cooling of the dam member so that the temperature of edge areas of the plates at the sides of the weld groove during continuous welding exceeds 100° C.

17. A structure formed of aluminum plates welded together, wherein at least some welds are produced using a method according to claim 16.

18. A structure according to claim 17, wherein the structure is a spherical tank.

* * * * *